United States Patent [19]

Eidsmore

[11] Patent Number: 5,694,975
[45] Date of Patent: *Dec. 9, 1997

[54] PRESSURE REGULATOR

[76] Inventor: Paul G. Eidsmore, 1700 Granite Creek Rd., Santa Cruz, Calif. 95065

[*] Notice: The term of this patent shall not extend beyond the expiration date of Pat. No. 5,303,734.

[21] Appl. No.: 501,100

[22] PCT Filed: Feb. 1, 1994

[86] PCT No.: PCT/US94/01333

§ 371 Date: Jul. 28, 1995

§ 102(e) Date: Jul. 28, 1995

[87] PCT Pub. No.: WO94/18617

PCT Pub. Date: Aug. 18, 1994

Related U.S. Application Data

[63] Continuation-in-part of Ser. No. 12,299, Feb. 1, 1993, Pat. No. 5,303,734.

[51] Int. Cl.⁶ ..................................................... G05D 16/18
[52] U.S. Cl. .............................. 137/489.5; 137/505.14; 137/906; 251/64
[58] Field of Search ...................... 137/906, 489.5, 137/505.14; 251/64

[56] References Cited

U.S. PATENT DOCUMENTS

| | | | |
|---|---|---|---|
| 2,261,364 | 11/1941 | Grove | 137/906 X |
| 2,320,886 | 6/1943 | Quiroz | 137/906 X |
| 2,573,522 | 10/1951 | Watt | 251/64 X |
| 2,587,728 | 3/1952 | Hoskins | 137/906 X |
| 2,827,077 | 3/1958 | Mitchell | 251/64 |
| 3,654,948 | 4/1972 | Nelson | 137/489.5 X |
| 3,689,025 | 9/1972 | Kiser | 137/906 X |
| 5,016,665 | 5/1991 | Konieczynski | 137/489.5 X |
| 5,303,734 | 4/1994 | Eidsmore | 251/64 X |

*Primary Examiner*—Stephen M. Hepperle
*Attorney, Agent, or Firm*—Fay, Sharpe, Beall, Fagan, Minnich & McKee

[57] ABSTRACT

A pressure regulator includes a housing having a chamber that receives a pressure responsive member 30. The pressure responsive member 30 includes an internal charge 90 that allows a movable portion 68 of the regulator to react in response to pressure differentials. A preferred embodiment of the regulator includes a dampening member defined by an o-ring 82 that exerts a drag on the pressure responsive member 30 to address oscillations associated with high flow rates. The dampening force can be varied according to the subject invention. Moreover, a normally planar poppet retaining member reduces manufacturing costs of the regulator and allows for a highly polished surface to address concerns with impurities. A biasing arrangement 120 is also incorporated into the regulator to assure that the poppet 68 seals against the valve seat 70 if the internal pressure charge of the regulator is lost.

16 Claims, 4 Drawing Sheets

PRESSURE REGULATOR

This application is a continuation in part of U.S. application Ser. No. 08/12,299, filed Feb. 1, 1993, now U.S. Pat. No. 5,303,734.

BACKGROUND OF THE INVENTION

This invention pertains to the art of pressurized fluid systems and more particularly to an apparatus for regulating the pressure in the system.

The invention is applicable to a pressure regulator and will be described with particular reference thereto. However, it will be appreciated that selected aspects of the invention may have application in related fluid environments and uses.

U.S. Pat. No. 5,033,505 discloses a predecessor pressure regulator. The structure disclosed therein includes a pressure responsive member disposed in a hermetically sealed housing. The pressure responsive member includes a stationary portion fixed to the housing and a movable portion interconnected thereto by a flexible member, such as a bellows. The pressure responsive member has a predetermined pressure charge enclosed therein so that, in response to fluid pressure in the housing, the volume changes and axial movement of a regulator member (e.g., poppet) occurs. This varies the size of the inlet opening, thereby regulating downstream pressure.

A self-threading poppet assembly is secured to the movable portion of the pressure responsive member. Preferably, a poppet is disposed in an inlet fluid line and cooperates with a valve seat defined at the interconnection of the inlet fluid line and the housing. The poppet is comprised of a suitable seal material that is preferably tapped upon threaded engagement with a poppet stem. This arrangement provides for a controlled, precise opening between the poppet and valve seat so that desired operational characteristics of the regulator can be achieved in accordance with design parameters.

As disclosed in the '505 patent, the poppet assembly is secured to the pressure responsive member by means of a stem clip. The stem clip includes a series of bent portions for reasons set forth in the patent. Although adequately addressing particular needs of the industry, it has been deemed desirable to provide an alternative arrangement that is less expensive to manufacture and satisfies other criteria. For example, the detailed bending in the prior arrangement consequently raises the cost of manufacture of the stem clip. Unfortunately, the bent configuration of the clip also does not lend itself to providing a highly polished surface finish. Since certain fluid systems using these types of regulators have stringent cleanliness standards, the surface finish of each component of the regulator can be very critical.

As also detailed in the '505 patent, at high flow rates, known pressure regulators have a tendency to oscillate. In fact, the oscillations occasionally result in an audible buzzing, and the oscillations can result in pressure variations in the fluid system downstream of the regulator. The '505 patent proposes use of a dampening means, such as an O-ring, interposed between the movable and stationary portions of the pressure responsive member. The dampening means exerts a slight drag on the axial movement of the movable portion which has proved to be highly effective in addressing the oscillation problem encountered at high flow rates.

A potential drawback to this arrangement is the effect of the dampening means on low flow rates. Specifically, the friction between the O-ring and an associated surface can limit the sensitivity of the pressure responsive member at low flow rates. Potentially, minute changes in pressure will not be effectively addressed by a pressure responsive member that incorporates a dampening means intended to resolve oscillation problems associated with high flow rates. Accordingly, it has been deemed desirable to maintain the oscillation dampening features at high flow rates, as well as to address concerns with sensitivity at low flow rates.

Still another benefit of the '505 patent is the provision for moving the pressure responsive member to a closed position if the charge is lost. For example, if the bellows were to leak and release the pressure charge, the poppet would seal against the valve seat and isolate downstream equipment from high pressure. The construction of the bellows tends to flatten under such conditions so that the pressure responsive member, particularly the poppet, moves to a shut-off or closed position with the valve seat. Due to the imprecise nature of the bellows construction, though, it has been deemed desirable to provide a positive action to urge the poppet to a closed position if the bellows loses its internal charge.

In many process systems, a predetermined set pressure charge is desired and the entire regulator is hermetically sealed from the external environment. Other process arrangements, however, require that the pressure regulator be adjustable and capable of manual or automated external control. When, as is often the case, pressure regulators are mounted in generally inaccessible or hard to reach areas, this results in additional difficulties should adjustment or replacement of the regulator become necessary. Accordingly, provision must be made for a pressure regulator assembly that can be adjusted and preferably can be adjusted from a remote location.

SUMMARY OF THE INVENTION

The present invention contemplates a new and improved pressure regulator that overcomes all of the above-referenced problems, and others, and satisfies the additionally enumerated features identified above, providing for effective regulation of fluid pressure.

According to a more limited aspect of the invention, the pressure regulator includes a housing having a chamber, and an inlet and outlet communicating therewith. A pressure responsive member regulates the fluid flow between the inlet and outlet. The pressure responsive member includes a variable dampening means which controls the ease with which the pressure responsive member can move.

According to another aspect of the invention, a poppet retaining means has a normal, generally planar configuration that is inexpensive to manufacture and permits it to be highly polished. Flexing portions of the retaining means are elongated to allow for relative movement between the poppet and pressure responsive member if required.

According to yet another aspect of the invention, the regulator incorporates means for biasing the poppet toward a closed position.

Still another aspect of the invention is the ability to adjust the regulator, particularly from a remote location.

A primary benefit of the new pressure regulator is the ability to vary the sensitivity of the regulator at low fluid rates while still addressing oscillation problems associated with high flow rates.

Another benefit is the reduced cost of manufacturing an improved surface finish associated with the poppet retaining means.

Yet another benefit is that a modified regulator can be charged after installation in the fluid system.

A still further benefit is that downstream pressure is monitored to provide necessary adjustment to the pressure charge to achieve constant supply pressure.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Referring now to the drawings wherein the showings are for purposes of illustrating preferred embodiments of the invention only, and not for purposes of limiting same, the FIGURES show a pressure regulator A incorporated in a fluid system and adapted to reduce pressure from an upstream location, such as a high pressure fluid source (not shown), and reduce it to a low pressure for a downstream use (not shown).

Figure 1:
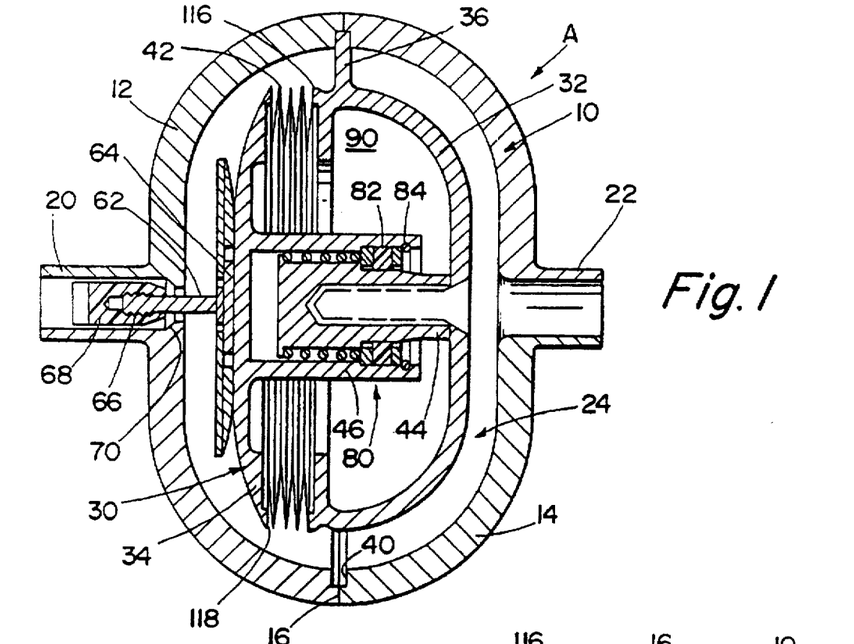
FIG. 1 is a longitudinal cross-sectional view of a subject new pressure regulator in an open position.

More particularly, and referring to FIG. 1, the illustrated pressure regulator A includes a housing 10 which is formed from cooperating portions 12 and 14. Although the housing portions are shown as upstream and downstream halves, still other arrangements can be used within the scope and intent of the subject invention. Preferably, the housing portions are secured together in a hermetically sealed manner. For example, the housing portions may be welded together along mating edges and as represented by numeral 16. In the illustrated embodiment, the housing includes an inlet 20 that communicates with an upstream fluid line (not shown) to supply pressurized fluid to the housing. Any conventional arrangement for interconnecting the inlet 20 or housing with the fluid line may be used, although the intended environment for the subject regulator is one that is exposed to high pressure, e.g., 3,000 p.s.i. or more, and finds particular application in, for example, the microelectronics industry where ultra clean environments are required. Accordingly, the fluid coupling must satisfy the requirements of the fluid system. It will be recognized, though, that selected aspects of the regulator may be employed in still other, related environments that may have more or less stringent requirements. Likewise, outlet 22 is formed in the housing second portion 14 and communicates with a downstream fluid line (not shown).

Figures 3, 4, 5:
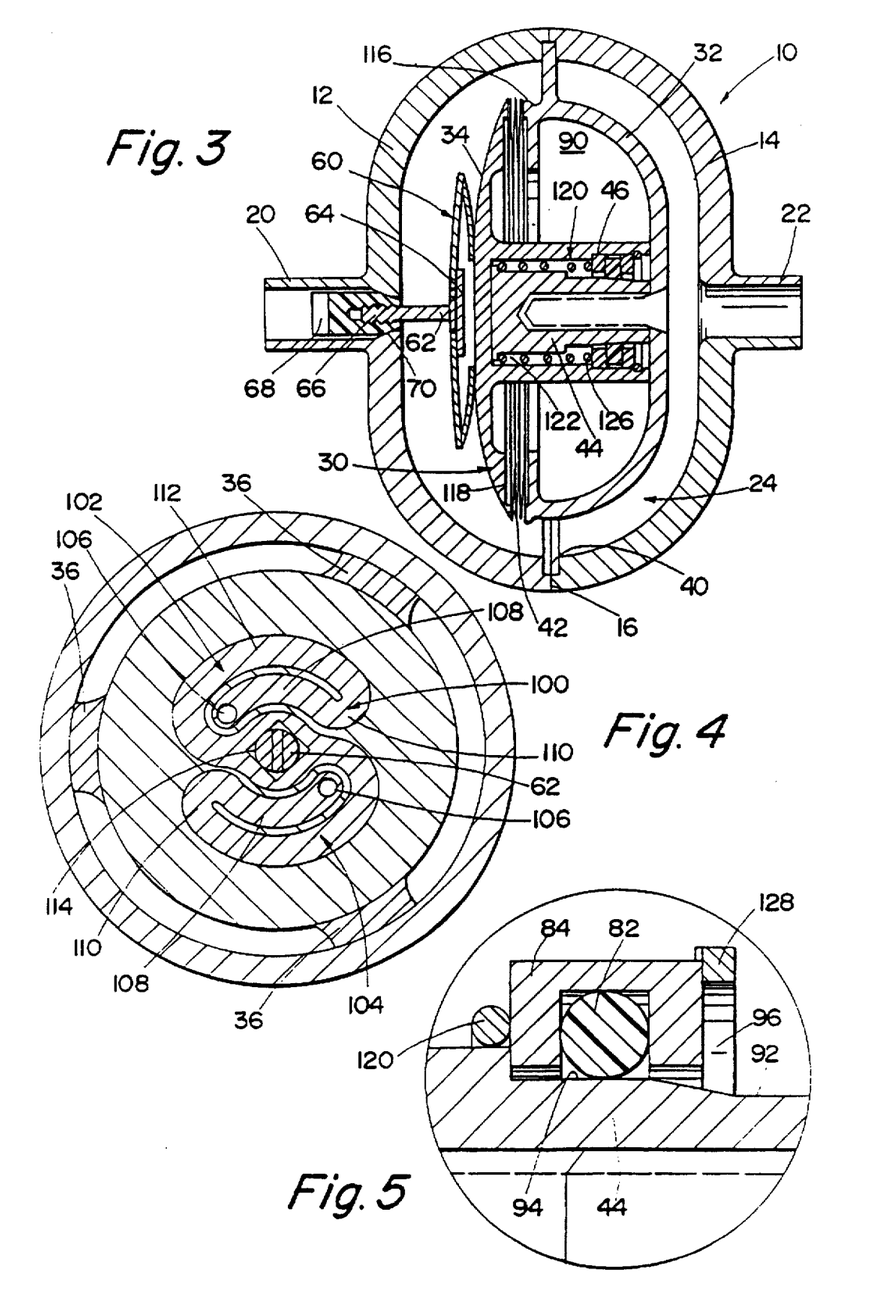
FIG. 3 is a longitudinal cross-sectional view of the FIG. 1 pressure regulator in a closed position with a poppet retaining member extended to limit pull out forces imposed on the poppet.
FIG. 4 is a view taken generally along the lines 4—4 of FIG. 1.
FIG. 5 is an enlarged, detailed view of a preferred assembly for varying a dampening force imposed on a pressure responsive member.

The housing has a cavity or chamber 24 that is substantially radially enlarged relative to the cross-sectional dimension of the fluid lines as represented by the inlet and outlet. At least partially secured within the chamber 24 is a pressure responsive member 30 that includes a stationary portion 32 fixed to the housing and a movable portion 34 operatively associated with the stationary portion. Circumferentially spaced legs 36 extend radially outward from the periphery of the stationary portion and are received within a continuous groove 40 in the housing so that when the housing portions are welded together along their mating edges, the stationary portion is also simultaneously secured in fixed relation by the weld. As best illustrated in FIG. 4, the legs 36 have a limited circumferential dimension so that fluid can communicate therepast from the inlet to the outlet.

Referring again to FIG. 1, the stationary and movable portions 32, 34 of the pressure responsive member are joined together by a flexible member, such as bellows 42. One preferred form of bellows includes a series of annular members or diaphragms that are alternately secured at radially inner and outer regions to define an accordion-like arrangement. Opposite ends of the bellows assembly are then secured to the stationary and movable portions of the pressure responsive member, respectively. Such a bellows arrangement has a relatively small stack height in a fully collapsed condition (FIG. 3).

Figure 2:
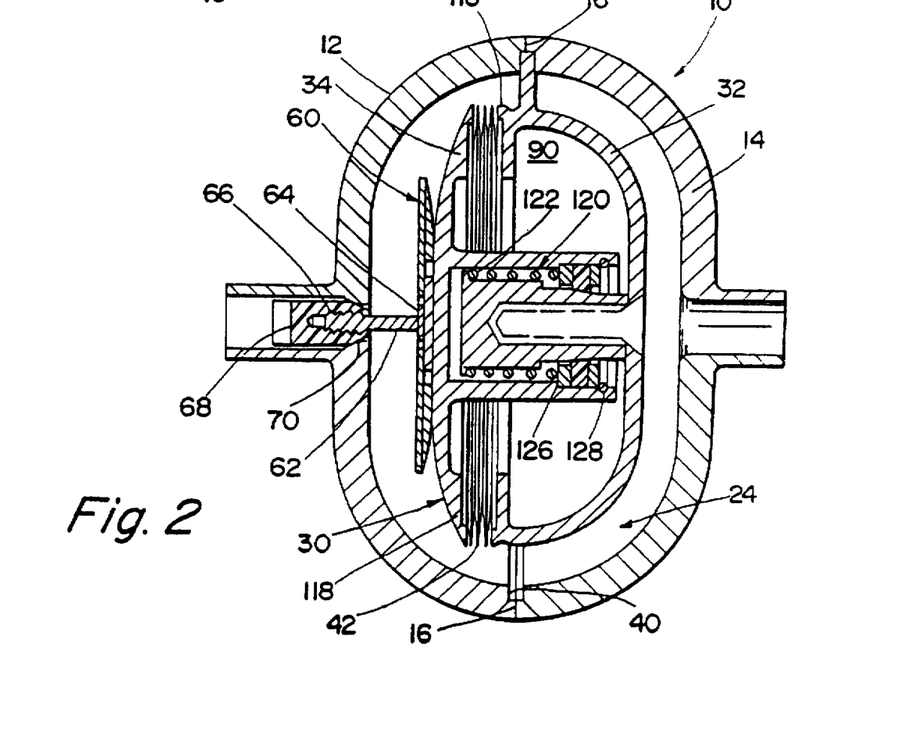
FIG. 2 is a longitudinal cross-sectional view of the FIG. 1 pressure regulator in a closed position.

Preferably, the central portion of the stationary and movable portions of the pressure responsive member also cooperate with one another to control axial movement of the movable portion 34 toward and away from inlet 20 in response to varying pressure in the chamber. As shown in FIGS. 1-3, an axial member 44 extends from the stationary portion toward the inlet (leftwardly as shown) and is fixedly secured to the stationary portion 32. This axial member 44 serves multiple purposes to be described below. Surrounding the axial member is a sleeve portion 46 extending from a central region of the movable portion 34 toward outlet 22.

A poppet assembly 60 is secured to the movable portion 34 of the pressure responsive member. More particularly, the poppet assembly includes a stem 62 having an enlarged base 64 defined at a first end thereof. The base is mounted adjacent the pressure responsive member while the stem 62 extends axially toward the inlet 20. In fact, and according to a preferred arrangement, the stem 62 proceeds outwardly of chamber 24 and into the inlet 20 of the regulator. A second or outer end 66 of the stem is threaded and receives an elastomeric member 68 that defines the poppet. Preferably, the poppet is self-tapping so that during assembly, it may be threaded onto the stem, and through a predetermined selected number of turns backed off of valve seat 70 to define a precise opening.

As described above, undesirable oscillations of the pressure responsive member are often associated with high flow rates. To overcome problems associated with the oscillations, a dampening means 80 is provided. Particularly, a preferred arrangement of the dampening means includes an elastomeric or resilient member, such as an O-ring 82, interposed between the axial member 44 and the sleeve portion 46 of the pressure responsive member. As shown, the O-ring 82 is axially and radially constrained by holding member 84. The holding member has a generally U-shaped configuration in cross-section to substantially surround the O-ring, although the inner diameter portion of the O-ring extends from the holding member and is adapted for engagement with the external surface of axial member 44. The engagement between the axial member and the O-ring exerts a drag or dampening force on the movable portion 34 of the pressure responsive member.

That is, an interior cavity 90 of the pressure responsive member has a predetermined pressure charge. The movable portion 34 moves axially in response to the pressure differential between cavity 90 and the fluid pressure in chamber 24. The flexible bellows 42 allows this relative movement and, as will be understood, the poppet member varies its relationship with valve seat 70 to regulate fluid flow between the inlet and outlet. The expansion and contraction of the member 30 in response to the pressure in chamber 24 is thus dampened by the frictional drag imposed by the O-ring.

The dampening means includes a means to vary the drag or dampening force. Specifically, one preferred from of varying means provides the external surface of the axial member 44 with discrete, different diameter regions that cooperate with the O-ring 82. As best illustrated in FIG. 5, a reduced diameter region 92 is connected to an enlarged diameter region 94 by a tapered region 96. Thus, when the O-ring is axially positioned around the enlarged diameter region 94 there is greater friction, and accordingly increased dampening force, imposed on the movable portion of the pressure responsive member. This permits the regulator to compensate for oscillations associated with high flow rates. On the other hand, as the poppet assembly moves toward its closed position, the O-ring engages tapering region 96 or the reduced diameter region 92. Less friction occurs between the O-ring and the axial member along these regions. This, in turn, provides less drag on the poppet arrangement. Accordingly, at very low flow rates associated with positions of the poppet adjacent the shut-off or closed position, the movable portion of the pressure responsive member can move more freely. In other words, the pressure regulator can respond to minute changes. This arrangement provides a sensitivity at very low flow rates while still addressing problems associated with oscillations at high flow rates.

Turning again to FIGS. 1–3, and additionally FIG. 4, the means for retaining the poppet assembly on the pressure responsive member is more particularly illustrated. The cross-sectional view (FIGS. 1 and 2) of the retaining means 100 best illustrates its planar configuration in a normal, unbiased state. As will be described further below, the planar configuration reduces the cost to manufacture the retaining means in comparison to prior arrangements.

The retaining means has a serpentine configuration shown in FIG. 4 in which elongated, flexible arms 102, 104 are secured at their innermost ends 106 to the movable portion 34 of the regulator. Preferably, the arms are spot welded at 106 to the surface of the movable portion. The retaining means has a symmetrical configuration as apparent in FIG. 4, so that description of one arm is equally applicable to the other. Arm 102, as indicated above, is secured at its inner end 106 and then proceeds along a generally arcuate or circumferential path 108. The arm then changes its direction through 180° at reverse curve portion 110 and continues along a radially outer position defining a second generally circumferential path 112. The second circumferential path proceeds past the secured end and then proceeds radially inward toward the stem 62.

A squared opening 114 receives the stem therethrough. The squared opening is sized to axially retain the base 64 of the poppet member but still allows the stem a predetermined amount of radial movement so that the poppet can self-center relative to the valve seat. Still further, this configuration cooperates with that of the base member to prevent rotation of the poppet stem so that the self-threading poppet can be rotated and advanced on the outer end of the stem.

The normally planar retaining means is preferred because of its lower manufacturing cost. No bending is required, and the retaining means can be easily formed from flat stock material. Still another important advantage of this arrangement is that the surface finish can be extrusion honed to a micro finish because of its planar configuration. This is extremely critical in, for example, the microelectronics industry where there is great concern for highly polished surfaces that address problems associated with impurities. On the other hand, the serpentine configuration still allows the retaining means to easily flex. This flexing action is important to retain the poppet on the stem as best illustrated by a comparison of FIGS. 2 and 3. In an over pressure situation (FIG. 3), the bellows will completely collapse, i.e., approach its stack height, and a rigid retaining means would tightly hold the poppet stem against the movable portion 34 and impose pull out forces on the poppet and stem. By providing elongated, flexible arms in the retaining means as described above, the poppet will generally maintain its same seating force against the valve seat, and the required flexure or axial elongation in the arrangement is taken up by the arms 102, 104.

Due to its construction, as the bellows flattens and approaches its stack height, the spring rate of the bellows becomes very high. The flexible retaining means, as described above, allows the bellows to collapse or flatten during high pressure or over pressure situations without destroying the poppet assembly.

Additionally, the movable and stationary portions of the pressure responsive member include means for protecting the bellows in an over pressure situation. The protecting means includes cooperating flanges 116, 118 that protrude in facing relation from the stationary and movable portions, respectively. When the bellows flattens in an over pressure situation, the first and last diaphragms that comprise the bellows construction are supported by the flanges 116, 118. For example, a pressure regulator could be exposed to high pressure if the poppet does not seal due to large particulates, or if high pressure is applied downstream of the regulator. In any event, the flanges will protect the bellows from damage when it flattens and approaches its stack height.

If the cavity 90 were to lose its pressurized charge, the pressure responsive member would typically move toward a closed position. A biasing means, such as spring 120, is incorporated into the regulator to counteract the spring effect of the bellows assembly and assure that the poppet moves to the closed position if the charge is lost. As shown, a first end 122 of the spring cooperates with a shoulder on the axial member 44. A second end 126 of the spring abuts against the holding member 84 and the opposite end of member 84 is constrained by a snap ring 128 in the sleeve portion 46. Thus, the biasing force of the spring tends to urge the movable portion 34 rightwardly or toward the outlet, thus advancing the poppet toward the valve seat and a shutoff position. Of course, other biasing arrangements may be used, within the spirit and scope of the subject invention.

Moreover, the spring 120 balances or negates the spring effect of the bellows by providing a very slight bias toward the closed position. This allows the regulator to be more sensitive or responsive to slight pressure changes without being effected by the relatively large spring rate.

Figure 6:
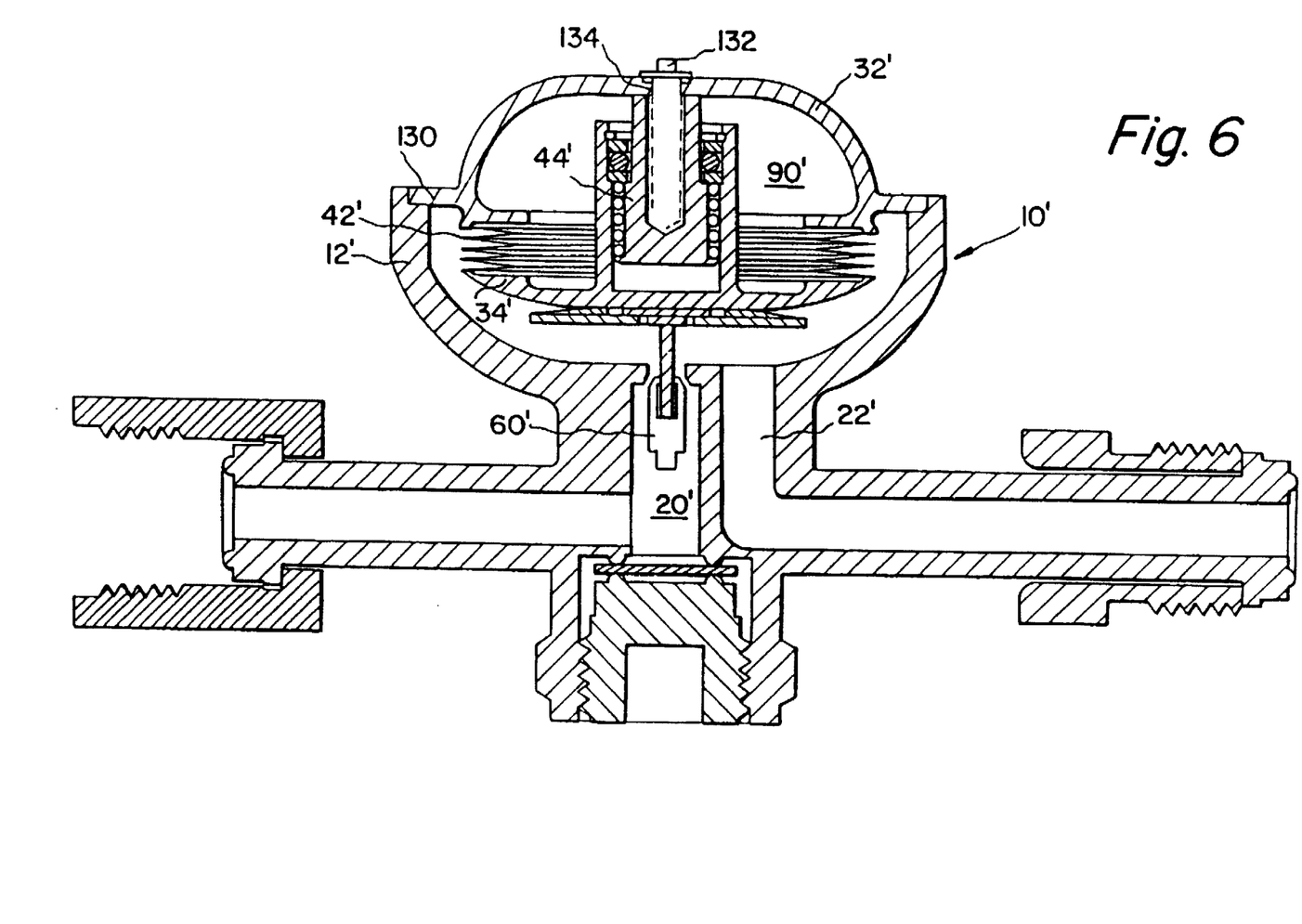
FIG. 6 is a longitudinal cross-sectional view of a modified pressure regulator.
Figure 7:
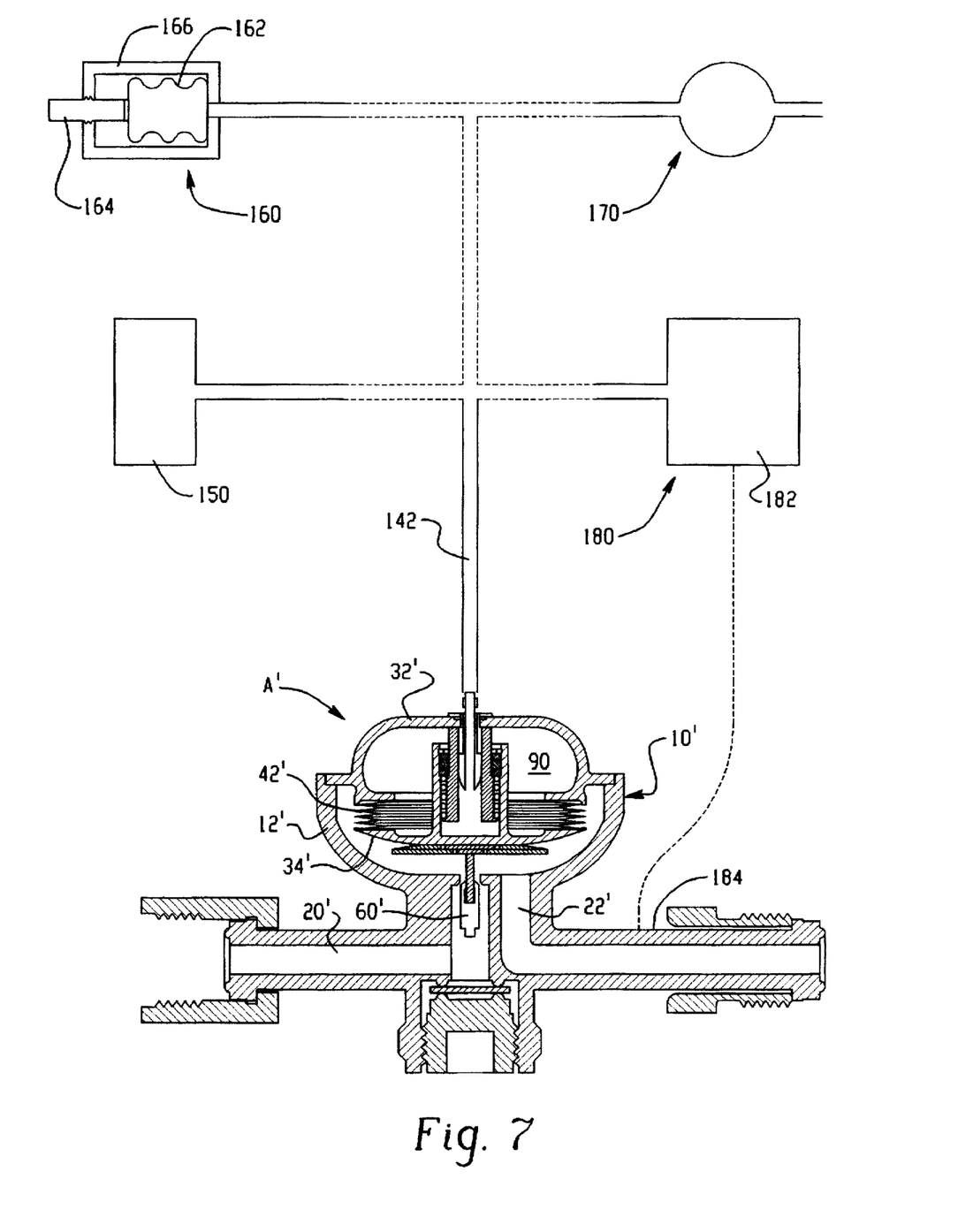
FIG. 7 is a longitudinal cross-sectional view of a pressure regulator similar to FIG. 6 and illustrating alternative arrangements for controlling process pressure.

Turning now to the embodiments of FIGS. 6 and 7, like numerals with a primed suffix (') will refer to like elements while new numerals will refer to new elements. The housing 10' is slightly modified since housing portion 12' now includes both the inlet 20' and the outlet 22'. The inlet and outlet communicate with upstream and downstream components, respectively, particular details of which form no part of the subject invention.

The second housing portion described with respect to the pressure regulator of FIGS. 1–5 is omitted and legs that interconnected the pressure responsive member to the housing are also eliminated. Instead, the legs are replaced by a circumferentially continuous flange 130 that is welded or otherwise hermetically sealed to the housing portion 12'. The pressure responsive member is substantially identical to the structure and function described above. Cavity 90' still contains a pressure charge that defines the operating parameters of the pressure responsive member but incorporates additional features. For example, it may be desirable to establish or pressure charge the cavity 90' after the regulator has been secured in the fluid system. This is difficult to do with the construction shown in FIGS. 1–5 because of the hermetically sealed housing. In the embodiments of FIGS. 6–7, however, axial member 44' receives cap member 132 that covers opening 134 providing access to the cavity 90'. With the cap member 132 removed, a source of fluid pressure (not shown) can be used to pressurize the cavity after the regulator has been secured in the fluid system. The pressure source is then removed and the cap member seals the opening 134 to permit the regulator to operate as previously described.

As shown in FIG. 7, the cap member is eliminated and the cavity may be selectively connected to alternative fluid pressure supplies to advantageously provide adjustment of the operating parameters from a location remote from the pressure regulator. A nipple 140 is provided in the opening. The nipple receives a fluid line 142 that leads to a remote location where alternative process pressure controls may be alternately used. For example, the fluid line can be connected to a supply 150 of generally constant pressure. The supply or external source 150 can be adapted as necessary for operation of the pressure regulator in the fluid system.

Another alternative is to provide a variable external source 160 as represented by an adjustable bellows assembly. This closed system includes a bellows 162 in fluid communication with the remote end of the fluid line 142. The volume of the bellows is selectively altered as required via adjustment knob 164 threadably connected to housing 166 that contains the bellows. By varying the axial position of the knob, the volume of the bellows 162 can be altered to, in turn, alter the pressure in cavity 90'. Of course, still other variable external sources using a closed system can be used with equal success.

Yet another alternative is to employ an inexpensive regulator 170 in the fluid line 142 to control fluid from an external source (not shown). The regulator 170 can be a fixed pressure or variable pressure regulator as desired to control the pressure in cavity 90'.

A microprocessor controlled arrangement 180 is still another alternative for controlling the pressure in cavity 90'. As shown in FIG. 7, a microprocessor controlled pressure module 182 is incorporated into the fluid line 142 that leads to an external pressure source (not shown). The pressure module operates in conjunction with a pressure transducer 184 disposed downstream of the regulator A'. The transducer 184 provides the pressure module with information relating to actual outlet pressure in the fluid system. The microprocessor can use this information to adjust the pressure in cavity 90' via the module 182. In this manner, adjustments can be made to the operation of the regulator to compensate for the effects of high flow rates, temperature or varying inlet pressures, all of which are representative examples of still other parameters that may be monitored and conveyed to the module 182.

The microprocessor controlled arrangement can also be used to monitor the inlet pressure and, likewise, the inlet fluid supply as a supply cylinder empties. As described in U.S. Pat. No. 5,238,016 or published application WO 87/04765, information stored in the microprocessor allows the process inlet pressure to be determined by monitoring the downstream or outlet pressure of the regulator. The greater the inlet pressure, the greater the force required to open the poppet. Stated another way, as the inlet pressure decreases (i.e., the supply cylinder empties), the pressure requirement in cavity 90' required to maintain a constant outlet pressure also decreases. Accordingly, the microprocessor, by monitoring the change of pressure supplied to cavity 90' to maintain a constant pressure downstream (at transducer 184) can use this information to calculate or determine the inlet pressure, and thus the supply volume.

The invention has been described with reference to the preferred embodiment. Obviously, modifications and alterations will occur to others upon a reading and understanding of this specification. For example, the poppet retaining means may adopt other configurations that perform the same function in substantially the same way. The dampening force varying means may be reversed in assembly so that the taper and different diameter portions are provided on the movable portion of the pressure responsive member. It is intended to include all such modifications and alterations, and others, insofar as they come within the scope of the appended claims or the equivalents thereof.

Having thus described the invention, it is now claimed:

1. A pressure regulator assembly for controlling flow in a fluid system, the assembly comprising:

a housing having an inlet and an outlet communicating with a chamber defined therein;

means for regulating flow from the inlet to the outlet on the basis of pressure in the chamber, the flow regulating means including a movable first member disposed adjacent one of the inlet and outlet and having a seal member for selectively enlarging and decreasing the one of the inlet and outlet, the movable first member having associated therewith means for varying the freedom of movement thereof at different positions to allow freer movement of the movable first member adjacent a shutoff position and a dampened range of movement adjacent full open position, the flow regulating means further including a pressurized volume separated from the chamber and having a portion secured to the movable first member, the pressurized volume including means for altering the pressure as desired by an operator which in turn adjusts the flow regulating means based on operating conditions of the fluid system.

2. The pressure regulator assembly as defined in claim 1 wherein the pressurized volume is disposed at a location remote from the housing and is connected thereto by a fluid line.

3. The pressure regulator assembly as defined in claim 1 wherein the pressurized volume includes an expansible chamber, the volume of which may be altered by an external adjustment mechanism.

4. The pressure regulator assembly as defined in claim 1 wherein the pressurized volume includes a bellows operatively connected to the housing through a fluid line.

5. The pressure regulator assembly as defined in claim 4 wherein the altering means includes a member that engages a wall of the bellows and may be selectively extended into and retracted from the bellows wall to vary the pressure in the pressurized volume.

6. A pressure regulator assembly comprising:

a housing having a chamber defined therein and an inlet and outlet both communicating with the chamber;

a pressure responsive member interposed between the inlet and outlet for regulating fluid communication therebetween, at least a portion of the pressure responsive member being movable relative to the chamber in response to fluid pressure, the pressure responsive member including means for varying the freedom of movement thereof at different positions to allow freer movement of the pressure responsive member adjacent a shutoff position and a dampened range of movement adjacent a full open position; and means for altering the pressure at which the pressure responsive member moves relative to the chamber, said pressure altering means being adjustable as desired by an operator.

7. The pressure regulator assembly as defined in claim 6 wherein the varying means include a resilient member that exerts a dampening force on the movement of the movable portion and a tapered surface with which the resilient member cooperates to vary the dampening force.

8. The pressure regulator assembly as defined in claim 6 wherein the pressure responsive member includes a flexible wall interconnecting the movable portion to the housing and enclosing a pressurized volume that determines the operating characteristics of the pressure responsive member, the volume having an opening through which the pressure therein may be selectively altered.

9. The pressure regulator assembly as defined in claim 8 further comprising an external source of pressure remotely located relative to the housing and communicating with the volume for establishing the operating characteristics of the pressure responsive member.

10. A pressure regulator assembly for controlling flow in a fluid system, the assembly comprising:

a housing having an inlet and an outlet communicating with a chamber defined therein;

means for regulating flow from the inlet to the outlet on the basis of pressure in the chamber, the flow regulating means including a movable first member disposed adjacent one of the inlet and outlet and having a seal member for selectively enlarging and decreasing the one of the inlet and outlet, the movable first member having associated therewith means for varying the freedom of movement thereof at different positions to allow freer movement of the movable first member adjacent a shutoff position and a dampened range of movement adjacent full open position, the flow regulating means further including a pressurized volume separated from the chamber and having a portion secured to the movable first member, the pressurized volume including means for altering the pressure as desired by an operator which in turn adjusts the flow regulating means based on operating conditions of the fluid system, wherein the pressurized volume includes a second pressure regulator remotely located relative to the housing and operatively interconnected thereto by a fluid line.

11. The pressure regulator assembly as defined in claim 10 wherein the second pressure regulator is air operated.

12. A pressure regulator assembly for controlling flow in a fluid system, the assembly comprising:

a housing having an inlet and an outlet communicating with a chamber defined therein;

means for regulating flow from the inlet to the outlet on the basis of pressure in the chamber, the flow regulating means including a movable first member disposed adjacent one of the inlet and outlet and having a seal member for selectively enlarging and decreasing the one of the inlet and outlet, the movable first member having associated therewith means for varying the freedom of movement thereof at different positions to allow freer movement of the movable first member adjacent a shutoff position and a dampened range of movement adjacent full open position, the flow regulating means further including a pressurized volume separated from the chamber and having a portion secured to the movable first member, the pressurized volume including means for altering the pressure as desired by an operator which in turn adjusts the flow regulating means based on operating conditions of the fluid system, wherein the pressurized volume includes a microprocessor control module that receives information relating to operation of the flow regulating means and alters the pressure in the pressurized volume in response thereto.

13. The pressure regulator assembly as defined in claim 12 further comprising a pressure transducer disposed downstream of the outlet for monitoring the outlet pressure of the flow regulating means, the pressure transducer being operatively connected to the control module.

14. A pressure regulator assembly comprising:

a housing having a chamber defined therein and an inlet and outlet both communicating with the chamber;

a pressure responsive member interposed between the inlet and outlet for regulating fluid communication therebetween, at least a portion of the pressure responsive member being movable relative to the chamber in response to fluid pressure, the pressure responsive member including means for varying the freedom of movement thereof at different positions to allow freer movement of the pressure responsive member adjacent a shutoff position and a dampened range of movement adjacent a full open position, wherein the pressure responsive member includes a flexible wall interconnecting the movable portion to the housing and enclosing a pressurized volume that determines the operating characteristics of the pressure responsive member, the volume having an opening through which the pressure therein may be selectively altered;

means for altering the pressure at which the pressure responsive member moves relative to the chamber, said pressure altering means being adjustable as desired by an operator; and an external source of fluid pressure and a second pressure regulator receiving fluid pressure therefrom for controlling the pressure to the opening.

15. A pressure regulator assembly comprising:

a housing having a chamber defined therein and an inlet and outlet both communicating with the chamber;

a pressure responsive member interposed between the inlet and outlet for regulating fluid communication therebetween, at least a portion of the pressure responsive member being movable relative to the chamber in response to fluid pressure, the pressure responsive member including means for varying the freedom of movement thereof at different positions to allow freer movement of the pressure responsive member adjacent a shutoff position and a dampened range of movement adjacent a full open position, wherein the pressure responsive member includes a flexible wall interconnecting the movable portion to the housing and enclosing a pressurized volume that determines the operating characteristics of the pressure responsive member, the volume having an opening through which the pressure therein may be selectively altered;

means for altering the pressure at which the pressure responsive member moves relative to the chamber, said pressure altering means being adjustable as desired by an operator; and a processor control module operatively connected to the opening for controlling the pressure in the volume.

16. The pressure regulator assembly as defined in claim 15 further comprising a pressure transducer that monitors fluid pressure downstream of the outlet and provides information to the control module to control the pressure in the volume.

* * * * *